United States Patent
Surges

(10) Patent No.: US 6,748,921 B1
(45) Date of Patent: Jun. 15, 2004

(54) REVERSION REDIRECTION DEVICE FOR AN INTERNAL COMBUSTION ENGINE

(76) Inventor: Carl Surges, 3769 Twin Lake Rd., Conover, WI (US) 54519

( * ) Notice: Subject to any disclaimer, the term of this patent is extended or adjusted under 35 U.S.C. 154(b) by 0 days.

(21) Appl. No.: 10/389,891

(22) Filed: Mar. 17, 2003

Related U.S. Application Data

(60) Provisional application No. 60/366,925, filed on Mar. 22, 2002.

(51) Int. Cl.$^7$ .............................................. F02B 31/00
(52) U.S. Cl. ...................................... 123/306; 123/308
(58) Field of Search ................................ 123/306, 308, 123/424, 432

(56) References Cited

U.S. PATENT DOCUMENTS

| | | | |
|---|---|---|---|
| 3,930,473 A | 1/1976 | McFarland, Jr. | 123/52 M |
| 4,094,277 A | 6/1978 | Goto et al. | 123/52 MF |
| 4,206,600 A | 6/1980 | Feuling | 60/312 |
| 4,474,145 A | 10/1984 | Boyesen | 123/73 PP |
| 4,738,233 A * | 4/1988 | Hitomi et al. | 123/190.2 |
| 4,848,281 A | 7/1989 | McCord | 123/52 M |
| 5,214,253 A | 5/1993 | Houston, Jr. | 181/238 |
| 5,386,145 A | 1/1995 | Boswell | 261/41.1 |
| 5,662,077 A | 9/1997 | Boswell | 123/184.21 |
| 5,671,709 A | 9/1997 | Sokoloski | 123/193.5 |
| 6,016,655 A | 1/2000 | Boswell | 60/324 |
| 6,065,459 A | 5/2000 | Stevens | 123/590 |
| 6,149,140 A | 11/2000 | Boswell | 261/40 |
| 6,158,412 A | 12/2000 | Kim | 12/306 |
| 6,167,857 B1 | 1/2001 | McCord | 123/184.53 |
| 6,615,795 B2 * | 9/2003 | Martin et al. | 123/308 |

OTHER PUBLICATIONS

Internet Printout from www.tornadoair.com for Tornado Air Management Systems, entitled "Simple Installation Guide" and "The Tornado Story".

Internet Printout from www.spiralmax.com for SpiralTech USA, Inc., entitled "SpiralMax™Installation Photograph" and "Spiral Max™ Turbo Air Twister".

* cited by examiner

*Primary Examiner*—Bibhu Mohanty
(74) *Attorney, Agent, or Firm*—Kinney & Lange, P.A.

(57) ABSTRACT

The present invention is an apparatus for redirecting a reversion pulse between a combustion chamber of an internal combustion engine and a fuel and air mixing device. The apparatus comprises a helical pathway through which a charge traveling from the fuel and air mixing device to the combustion chamber flows. The apparatus further comprises a chamber disposed at a periphery of the helical pathway. A reversion pulse traveling from the combustion chamber to the fuel and air mixing device flows into the chamber.

10 Claims, 12 Drawing Sheets

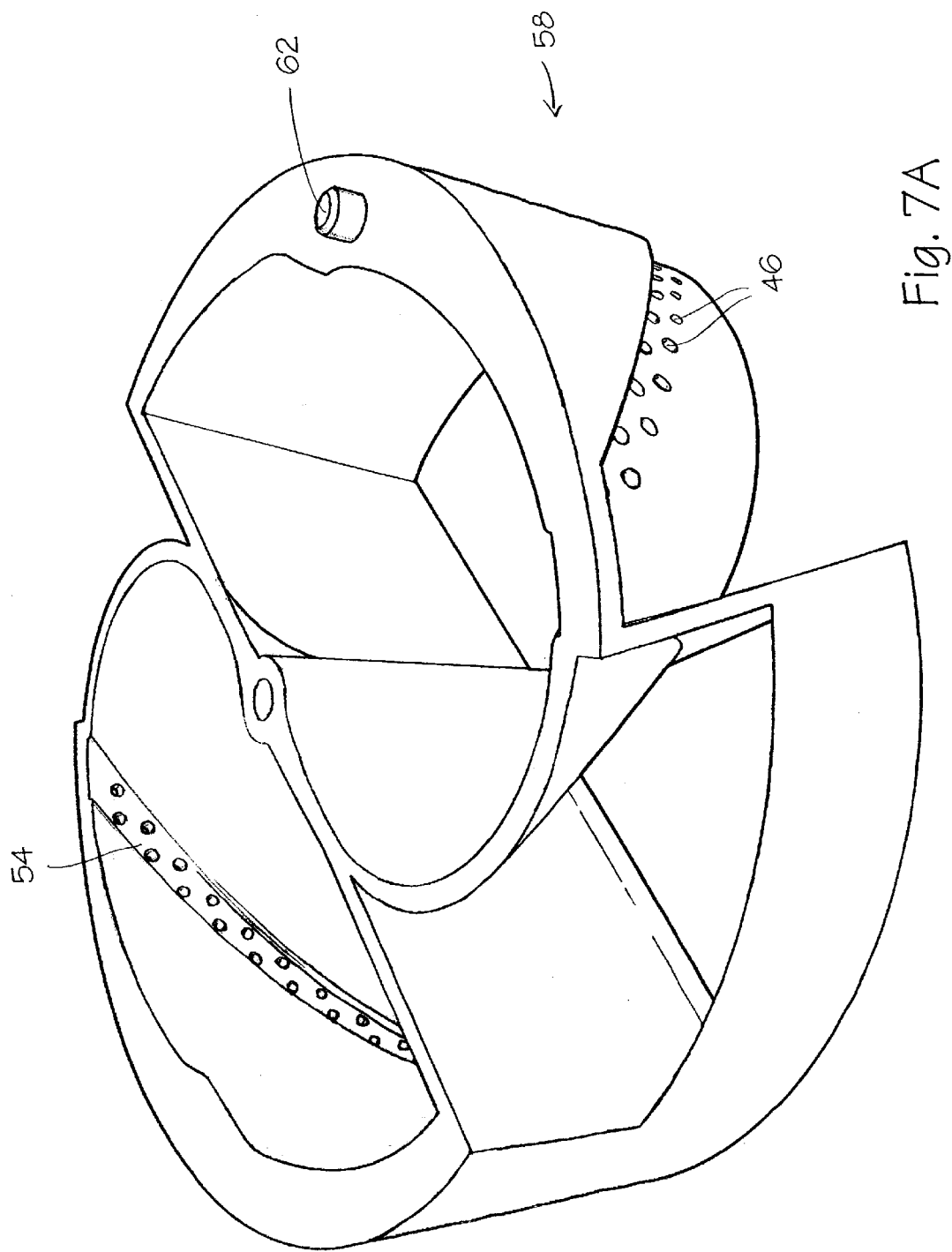

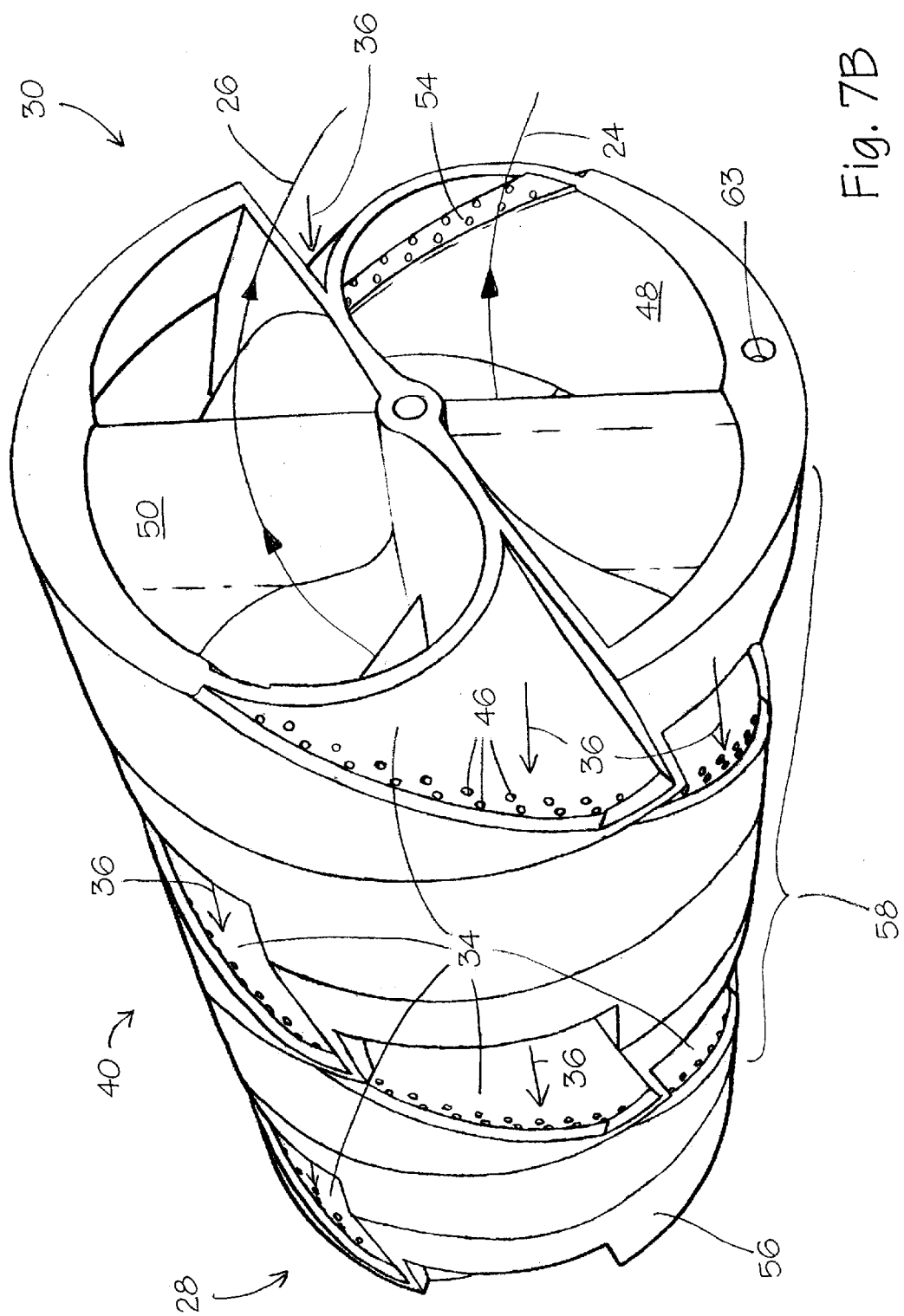

REVERSION REDIRECTION DEVICE FOR AN INTERNAL COMBUSTION ENGINE

CROSS-REFERENCE TO RELATED APPLICATIONS

This applications claims priority from U.S. Provisional Patent Application Serial No. 60/366,925, filed Mar. 22, 2002, for "Reversion Redirection Device for an Internal Combustion Engine" by Carl Surges.

BACKGROUND OF THE INVENTION

A carbureted internal combustion engine employs an intake manifold to distribute a fuel and an air mixture produced by a carburetor to the cylinders of the engine. An intake manifold typically has a plenum chamber below the carburetor to receive a mixture of fuel and air from the carburetor. From the plenum, the mixture is directed to the cylinders through ducts called runners or tracts. The tracts exit from the manifold at inlet ports to the engine. These ports lead to the cylinders through inlet valves.

Reversion disrupts induction, which is the aspiration of the intake charge into and through the intake tract, and therefore prevents the delivery of the proper mix of fuel and air to the combustion chamber in response to changes in throttle and power demand. Reversion refers to the movement of exhaust gases in the reverse direction, backing up through the intake flow path. That effect essentially robs the engine of power that would otherwise be available from the charge of fuel. It is appreciated that internal combustion engines are designed to move gasoline vapors in one direction, through the intake as an air-fuel mixture, into the combustion chamber and, following combustion, from the combustion chamber as exhaust gases out the exhaust port. When instead exhaust gas reenters the intake tract and pollutes the air-fuel mixture, the nature of the combustible mixture is altered. The potential power of combustion that would otherwise be obtained from the fuel in the internal combustion process is reduced.

Reversion is the reverse or back flow of a portion of the intake charge through an intake tract of an engine as a result of a pattern or series of reverse or upstream traveling shock waves or pulses that enter the intake tract when the intake valve is open. These shock waves or pulses are the result of the high pressure developed by combustion in the combustion chamber, and also back pressure from the exhaust, both of which can be transmitted to the intake tract through an open intake valve, thereby contaminating the intake charge.

Reversion has been observed to move mainly through the stagnant or dead spaces in the intake tract where the intake flow has little or no velocity, and more importantly, along the wall of the intake tract in essentially the boundary layer of the intake charge flow stream. The upstream traveling pulses and back pressure cause some of the adjacent downstream traveling intake charge flow to be slowed, stalled, or even reversed. The upstream traveling pulses and back pressure tend to decrease or dilute the intake vacuum signal. A decreased vacuum signal represents a corresponding drop in induction as well as a resultant loss in engine responsiveness and smoothness.

Consider the operation of one cylinder in a four stroke internal combustion engine. In a first (or intake) stroke, the intake valve opens and the piston is moved downwardly, creating a low pressure, relative to atmospheric pressure, in the combustion chamber above the piston head. Consequently, air flows through the intake manifold, a conduit connected to the carburetor, from the high pressure of the ambient atmosphere to the lower pressure in the engine. The air passes through the carburetor, drawing gasoline droplets out from the carburetor's metering rod, which regulates the flow rate of gasoline drawn into the airstream, creating an air and fuel mixture of the proper proportion for efficient combustion. The mixture is drawn into the cylinder head's intake port and, with the intake valve opening, into the combustion chamber.

In the second (or compression) stroke, the intake valve closes and the piston moves upward, thereby compressing the fuel and air mixture within the combustion chamber. Near the end of the piston's upward stroke, the spark plug is ignited, igniting the compressed mixture and creating an explosion in the confined volume. The more completely the gasoline droplets are vaporized during the compression cycle, the more efficiently the engine produces work from the gasoline fuel. The smaller the gasoline droplets, the more fully they will vaporize during the compression stroke. Larger, unignited gasoline particles or droplets which result from inefficient carburetion represent wasted energy.

The force created by the expanding gases in the explosion drives the piston downward, the third (or power) stroke in the cycle; in turn, the piston rotates the engine's crankshaft, producing work. During the fourth (or exhaust) stroke, the exhaust portion of the cycle, the exhaust valve opens the exhaust port. The piston moves upward and forces the exhaust gases, the products of combustion, out the exhaust port. Due to the high pressure created in the chamber, the exhaust gases flow out of the combustion chamber of the cylinder and through the engine's exhaust pipe, ultimately exiting to the atmosphere. The foregoing cycle repeats.

The points at which the valves open and close during the cycle is typically determined by the lobes on a camshaft, which in turn are synchronized to the rotation of the crankshaft driven by the pistons. The point in the cycle at which the spark plug is ignited is synchronized to the rotation of that same crankshaft.

During the intake stroke, when the intake valve is open and the piston moves downward, the air and fuel mixture is drawn into the combustion chamber. During the exhaust stoke, when the piston moves upward, the exhaust gases are forced through the open exhaust valve. At the end of the exhaust stroke of one cycle and the beginning of the intake stroke of the next cycle, the intake valve starts to open even though the exhaust valve has not fully closed. This is the point in the cycle referred to as a period of "valve overlap." It is at this point in the cycle of operation in which reversion, i.e. movement of exhaust gases back up through the intake flow path, occurs. Importantly, reversion causes exhaust gases to pollute and dilute the clean air-fuel mixtures, thereby dramatically altering the nature of the combustible mixture and reducing the potential power that would otherwise be obtained from the fuel in the mixture. As those skilled in the art recognize, valve overlap is a necessary and unavoidable condition inherent in the four stroke engine cycle.

During valve overlap, the different pressure levels present in the intake and exhaust paths are exposed to one another through the combustion chamber. The intake path is closer to the atmosphere and is a lower pressure area. The exhaust gases are at a higher pressure created by the fourth stroke in the cycle and hot expanding gases. The exhaust gas naturally flows to the lower pressure region of the inlet. Because exhaust gases have not been completely evacuated from the combustion chamber and because the intake flow of air-fuel mixture to the combustion chamber is constrained by the opposing flow of exhaust gases, the ultimate result is that the engine develops less power than it otherwise could, an effective loss of power.

Reversion is usually even more problematic in two stroke internal combustion engines than in four stroke engines because of several reasons. First, two stroke engines operate at higher speeds than four stroke engines. Additionally, two stroke engines lack a separate intake stroke compared to four stroke engines; therefore, the intake valve is open more frequently than in a four stroke engine. Reversion is also a problem in virtually any engine when operating under heavy load conditions such as while powering a vehicle in a climb. Reversion has been found to be so great in some engines, particularly two stroke engines, that the engines will not operate without means to reduce or contain the reversion.

Known constructions effective for reducing or containing reversion include devices known as reversion traps, usually located in the intake passage, and reversion tubes, usually located in the exhaust passage. Reversion traps generally include a restriction or neck in the exhaust passage upstream of a larger expansion area or chamber. The restriction or neck traps or limits the back flow of pressure and contaminants through the conduit. Reversion tubes operate generally in the same manner as reversion traps, but in the intake passage. Shortcomings of both devices include that they do little or nothing to improve intake charge atomization and vaporization and are not designed to recapture and put to useful work the energy of the reverse pulses or back pressure.

There is a need for a device which not only reduces the negative effects of reversion but also uses reversion for productive work, thus making the engine more efficient. It is known that to the extent an engine can be made more efficient, the engine will be more economical to run. Such efficiency also can also lead to the reduction of harmful exhaust emissions.

BRIEF SUMMARY OF THE INVENTION

The present invention is an apparatus for redirecting a reversion pulse between a combustion chamber of an internal combustion engine and a fuel and air mixing device. The apparatus comprises a helical pathway through which a charge traveling from the fuel and air mixing device to the combustion chamber flows. The apparatus further comprises a chamber disposed at a periphery of the helical pathway. A reversion pulse traveling from the combustion chamber to the fuel and air mixing device flows into the chamber.

BRIEF DESCRIPTION OF THE DRAWINGS

FIG. 7A is a perspective view of an intermediate section in one embodiment.

FIG. 7B is a perspective view from the posterior end of the embodiment of FIG. 3, with the posterior section removed.

DETAILED DESCRIPTION

The present invention relates generally to a device for improving the vaporization of the intake charge for an internal combustion engine and reducing the harmful effects of reversion pulses. More particularly, the present invention relates to an apparatus for utilizing energy from reversion pulses in the intake tract for drawing poorly or inadequately atomized or vaporized elements into the apparatus, mixing the collected elements, and discharging them back into the intake tract in a more finely atomized state. The apparatus thereby improves the overall vaporization of the intake charge and reduces the reversion that can adversely affect induction as well as intake charge quality.

In use, the apparatus of the present invention is incorporated into an intake tract of a typical prior art internal combustion engine. The intake tract is located intermediate a charge forming or fuel/air mixing device, such as a fuel injector or carburetor, and a combustion chamber of the engine. The apparatus advantageously includes no moving parts, therefore contributing to a long life without requiring costly and inconvenient maintenance.

Locating the device of the present invention closer to the combustion chamber takes the greatest advantage of reversion, as reversion is generally stronger there, although other more upstream locations may also be used.

Figure 1:
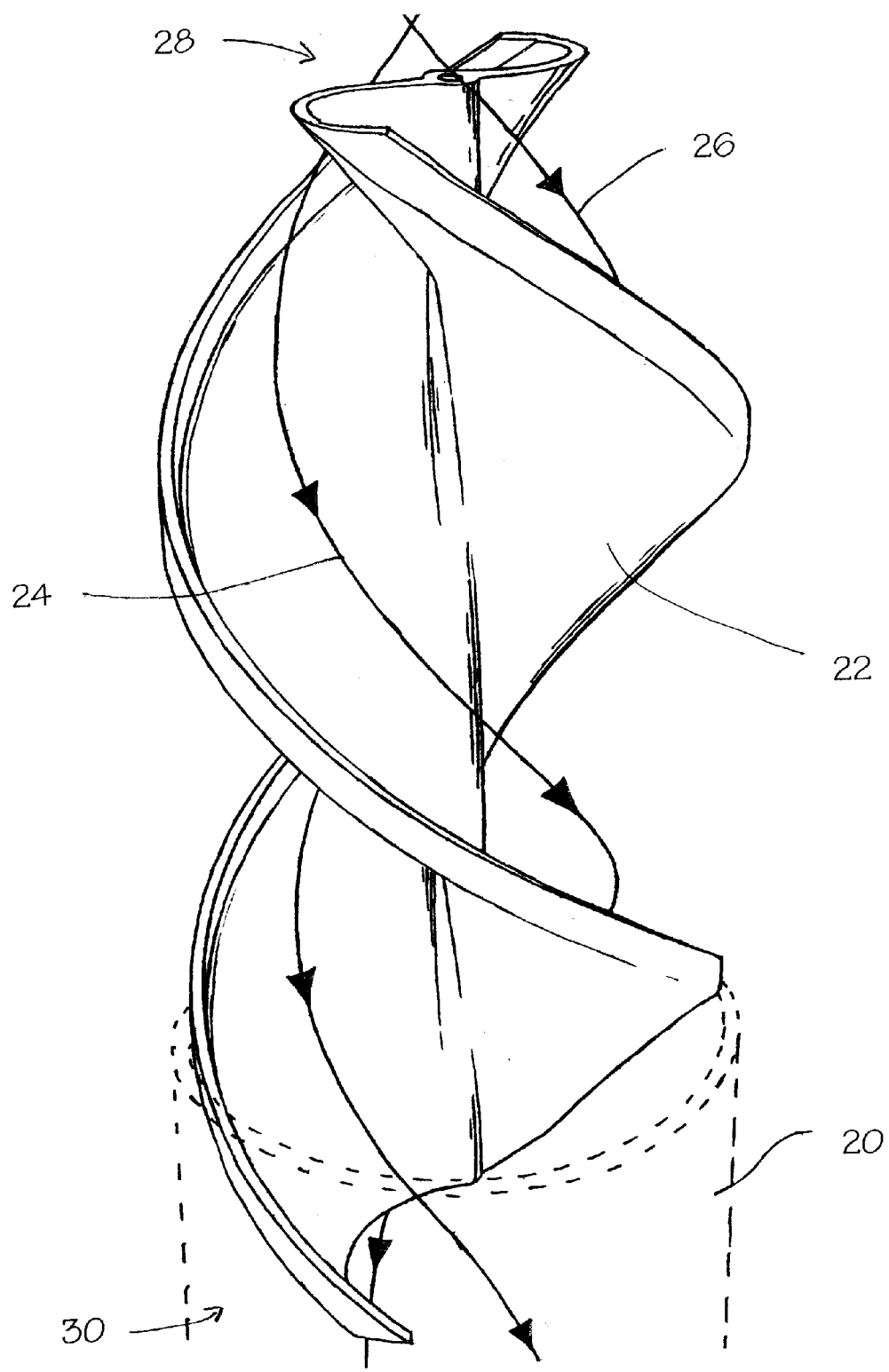
FIG. 1 shows a form illustrating the air flow path of the intake air flowing through the present invention.

FIG. 1 is a perspective view showing tube 20 and form 22, illustrating air flow paths 24 and 26 of the incoming charge. While form 22 is shown partially removed from tube 20 for clarity of illustration, it is to be understood that form 22 is housed within tube 20 to cause the desired air flow. Because the orientation of the device of the present invention depends on the relative placement of a fuel/air mixing device and the combustion chamber of an engine, the device may not be oriented vertically as illustrated in FIG. 1. For purposes of this discussion, intake end 28 of the device will also be referred to as the top or anterior end. Engine end 30 will also be referred to as the bottom or posterior end.

Figure 2:
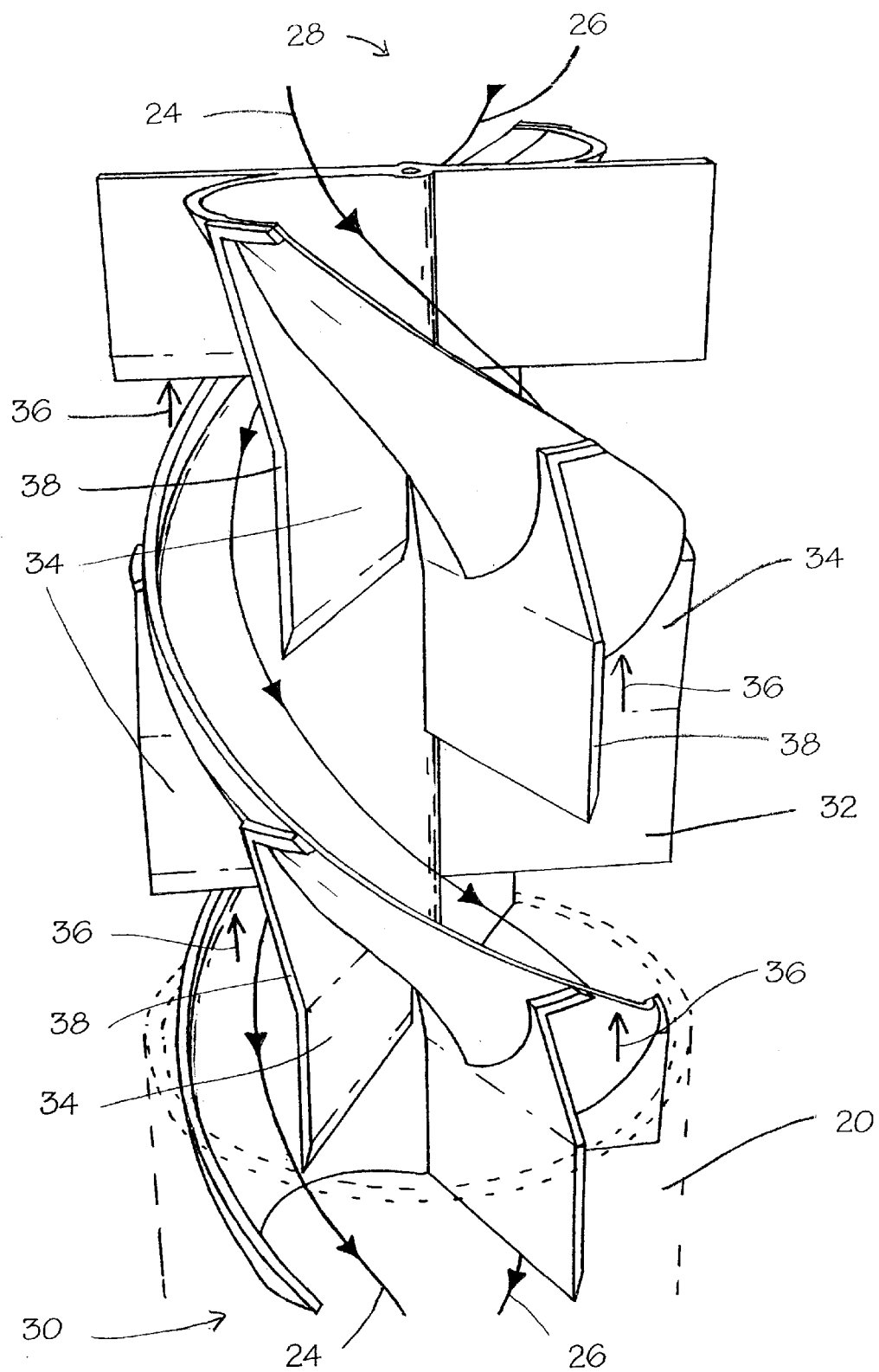
FIG. 2 shows an alternate form having chambers for capturing the reverse direction reversion pulses in an intake tract.

FIG. 2 shows an alternate form 32 having chambers for capturing the reverse direction reversion pulses 36 in an intake tract. In this illustration, intake airflow paths 24 and 26 flow in a spiraling or helical pattern from anterior end 28 to posterior end 30, much as they did around form 22 of FIG. 1. Form 32 additionally includes walls 38 which form chambers 34 about the periphery of tube 20 for capturing reverse-flowing reversion pulses 36.

Figure 3:
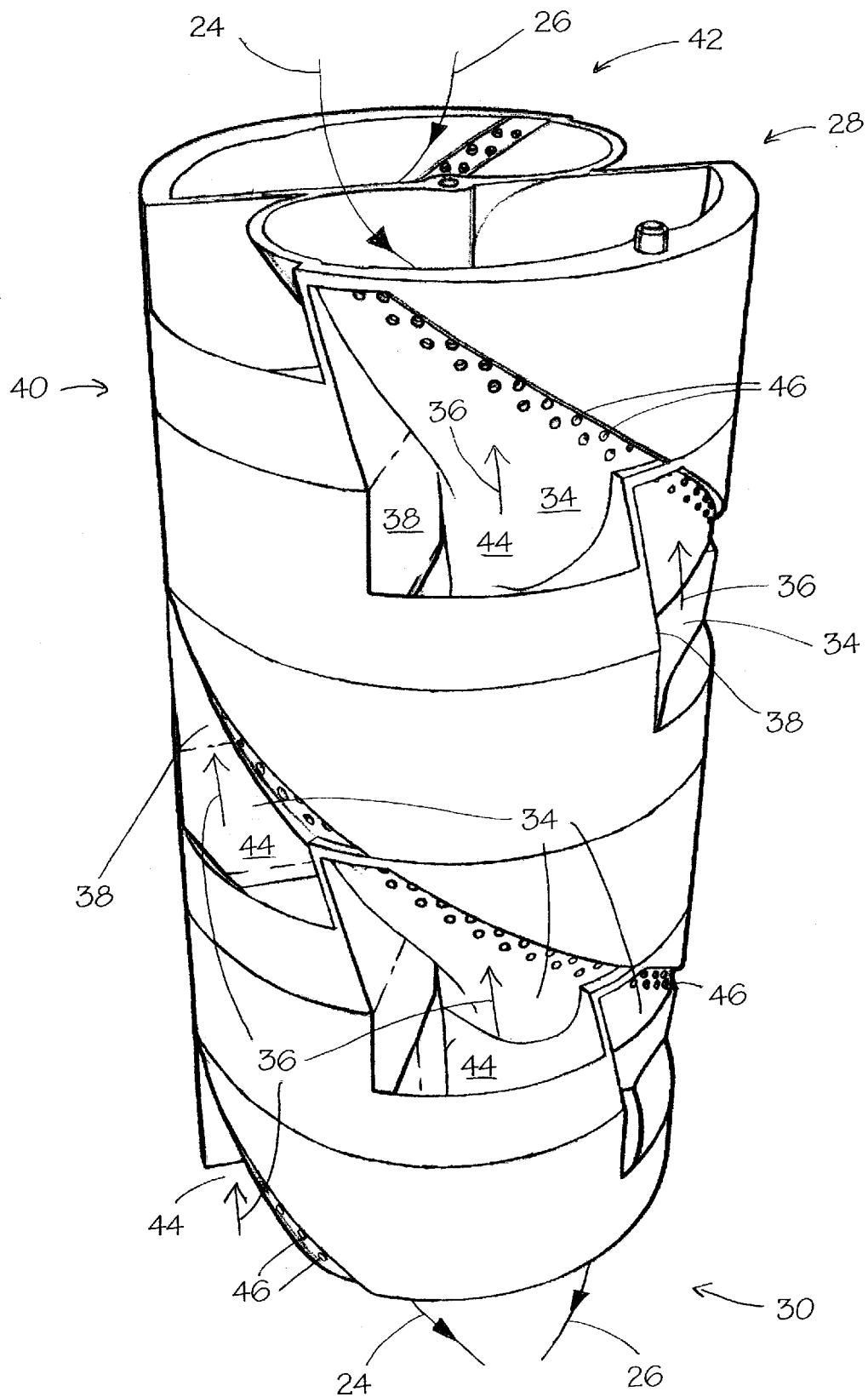
FIG. 3 shows a preferred embodiment of the present invention.

In FIGS. 3–8, tube 20 is not shown so that the features of device 40 may be seen more clearly. FIG. 3 illustrates a preferred embodiment of the present invention. The present invention consists of a cylindrically-shaped device 40; in one embodiment, device 40 is housed tightly within tube 20 during use to form an airtight bond between device 40 and tube 20. In an alternative embodiment, tube 20 may be omitted, and chambers 34 may be otherwise sealed. Intake pathway 42 is traveled by intake air flows 24 and 26 from anterior end 28 to posterior end 30. In contrast, reversion pathway 44 is followed by reversion pulses 36 from posterior end 30 to anterior end 28. Reversion pathway 44 is disposed about the periphery of intake pathway 42. Intake pathway 42 interfaces with reversion pathway 44 at orifices 46. The number and pitch of the spiral or helical turns within device 40 may vary depending on the particular application. The direction of the spiral or helix followed by intake air flows 24 and 26 may also be changed. While device 40 is depicted as a straight cylinder, it could also include a curve or direction change.

Figure 4:
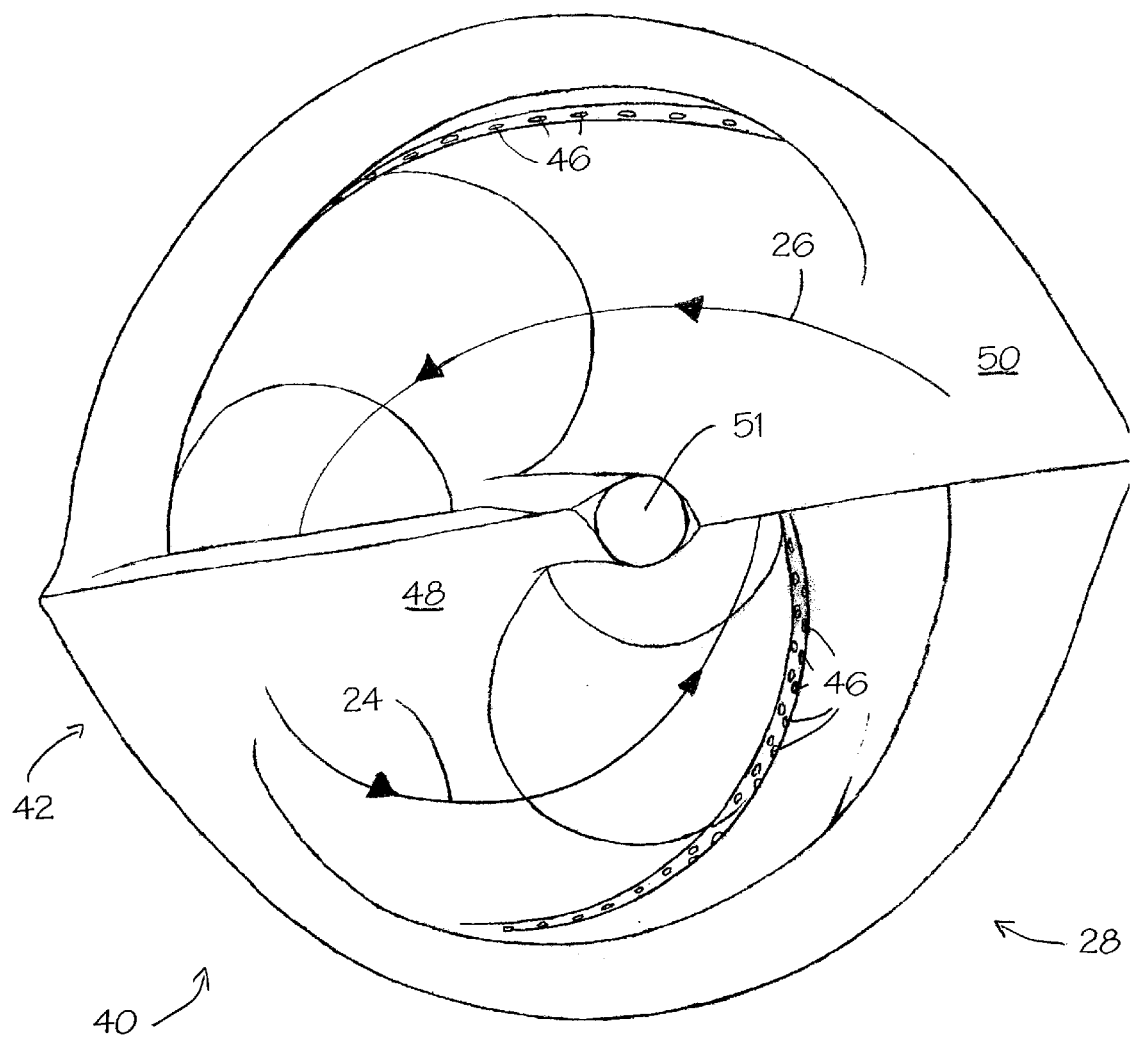
FIG. 4 shows the intake air pathway of FIG. 1 from the anterior end of the embodiment of FIG. 3.

FIG. 4 shows the intake air pathway 42 of FIG. 1 from anterior end 28 of the embodiment of FIG. 3. Device 40 forces the incoming air and fuel from the air and fuel mixing device to follow spiral or helical air flow paths 24 and 26 on their way to the engine cylinder. This spiraling action causes the larger fuel droplets, which tend to follow a straighter path, to impact with the inner walls of intake pathway 42 while allowing the finer gasoline droplets to continue flowing directly into the engine. In this embodiment, the design of device 40 is bilateral, in that two halves 48 and 50 of device 40 spiral around each other about axis 51, separated by 180 degrees. There is no communication between halves 48 and 50, except at anterior and posterior ends 28 and 30 respectively of device 40. In an alternate embodiment, axis 51 may comprise a hollow central hub allowing for mixing of airflows along its length. While a preferred embodiment is bilateral, it is contemplated that device 40 may also be unilateral, trilateral, quadrilateral, or comprise any suitable number of sections spiraling about each other. A unilateral design may well prove to be more easily manufactured, and may work synergistically with swirl-type combustion chambers or valve inlet architectures.

Figure 5:
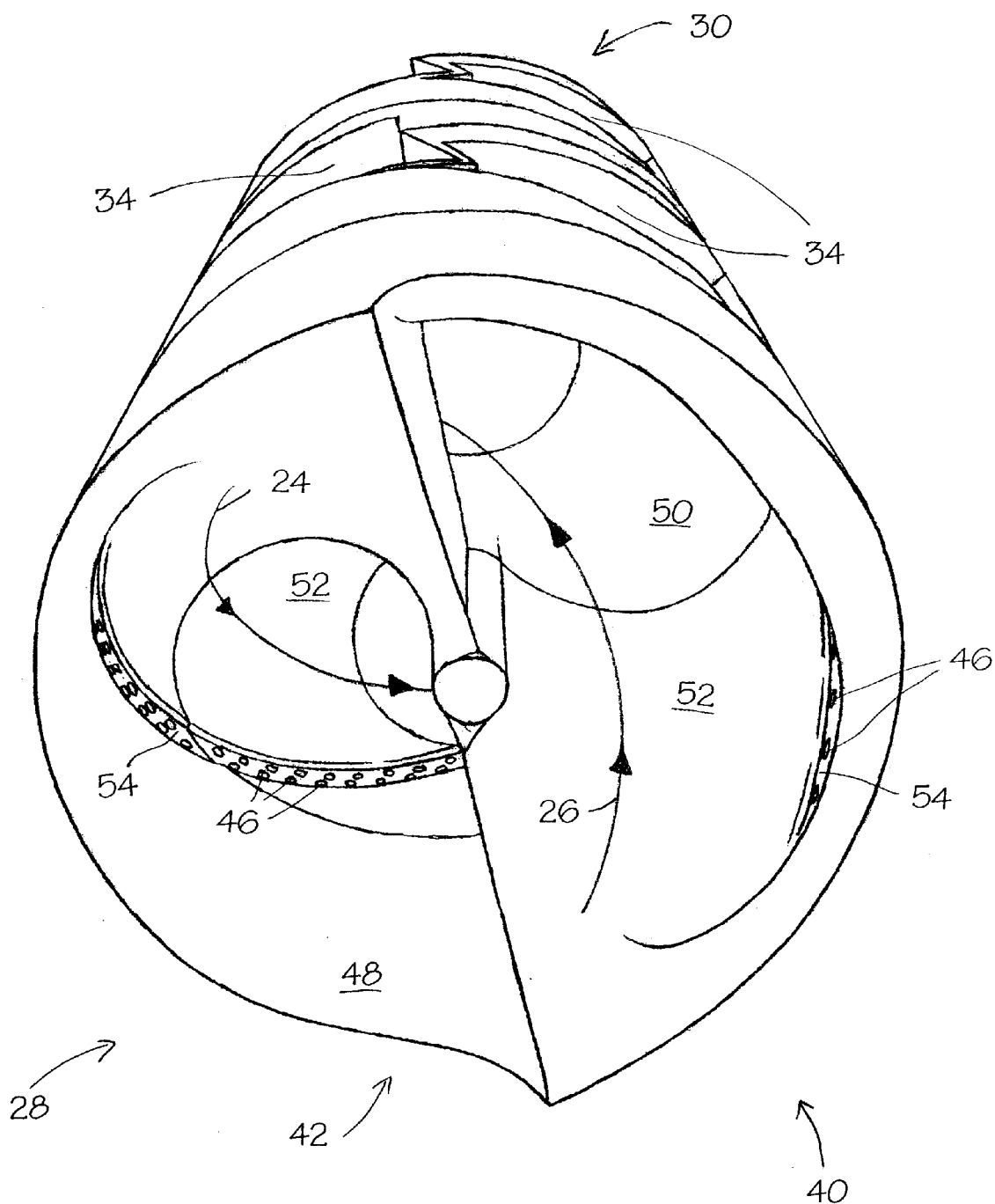
FIG. 5 shows a perspective view from the anterior end of the embodiment of FIG. 3.

FIG. 5 shows a perspective view from anterior end 28 of the embodiment of FIG. 3. As intake air flows in paths 24 and 26 of respective half 48 or 50 of device 40, the smaller droplets of gasoline in the air and fuel mixture travel in spiral or helical pattern 24 or 26 from anterior end 28 of device 40 to posterior end 30. However, larger fuel droplets impact walls 52 of intake pathway 42. The accumulation of these larger droplets forms a flowing film of wet fuel on inner walls 52. Device 40 includes fuel collecting trough 54 into which the wet fuel flows. Since the wet fuel tends to flow outwardly, trough 54 is located at the most extreme outside portion of intake passageway 42.

Fuel collecting trough 54 contains orifices 46. Some of the fuel may pass through orifices 46 and into reversion chambers 34. As will be explained later, reversion pulses 36 traveling in a direction from posterior end 30 to anterior end 28 will atomize the wet fuel in reversion chamber 34 and in trough 54, by spraying wet fuel back into intake pathway 42 in a finely divided state. Even in the absence of reversion pulses, the higher velocity on the intake pathway side of device 40 leads to a natural pressure differential between intake pathway 42, which is at a lower pressure, and reversion chambers 34, which are at a higher pressure. This pressure differential leads to the same result: air from reversion chambers 34 sprays fuel within chambers 34 and trough 54 into intake pathway 42 in an atomized state. These droplets are then able to travel through the intake pathway all the way through posterior end 30 without further impacting walls 52. The effect of device 40 is to increase the amount of fuel usable by the engine by taking advantage of the work produced by free energy in the form of reversion pulses or differential pressure. Additionally, device 40 makes use of fuel that would otherwise be wasted. Ideally, device 40 is long enough that all liquid fuel in trough 54 is atomized before it reaches posterior end 30.

Figure 6:
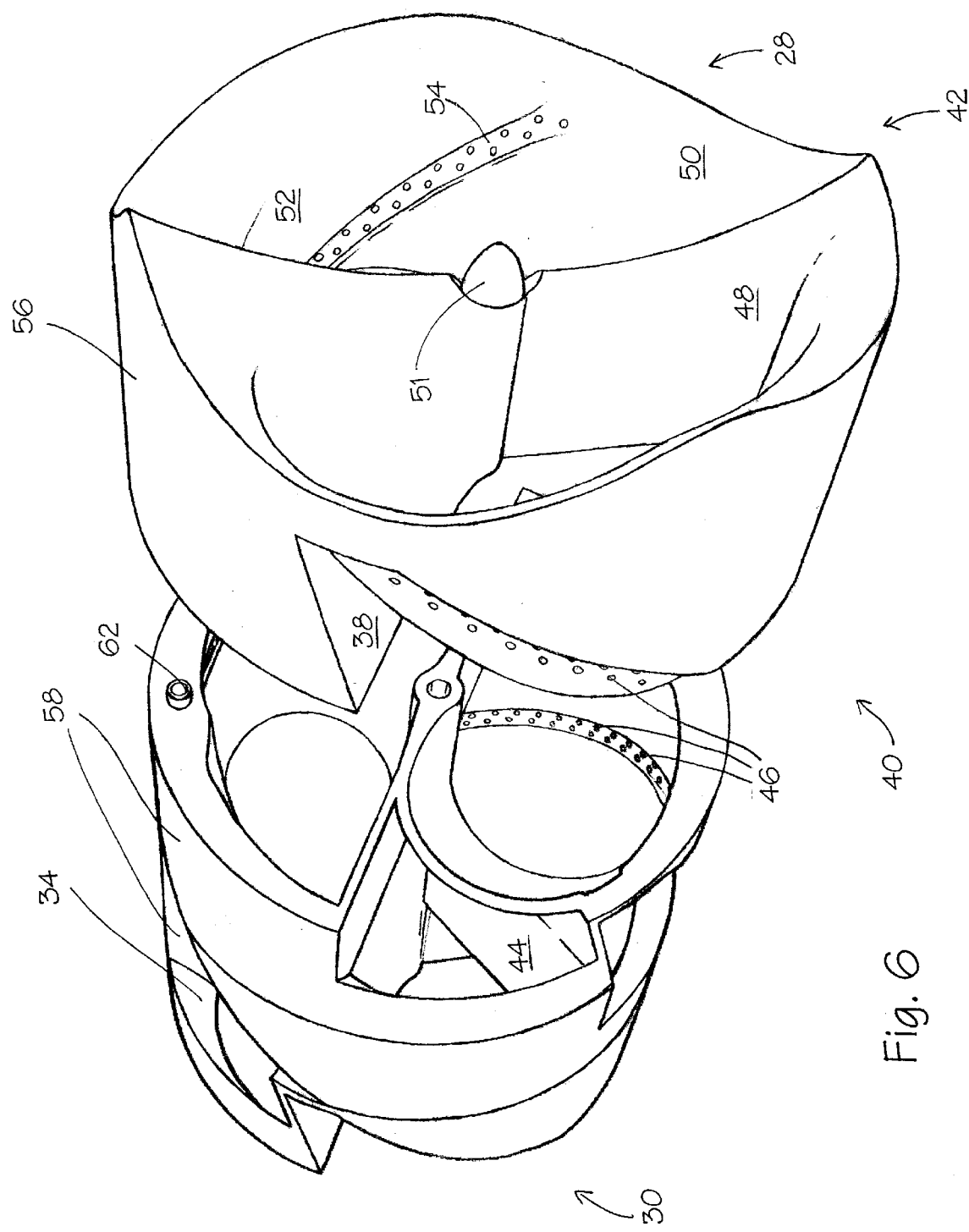
FIG. 6 illustrates the sectional construction of one embodiment of the present invention.

FIG. 6 illustrates the sectional construction of one embodiment of the present invention. In the design presented, device 40 is sectioned along its length for ease of construction and flexibility of application. Device 40 comprises anterior section 56, intermediate sections 58, and posterior section 60 (not shown). In anterior section 56, the intake site has been modified to provide a more aerodynamic transition for the incoming charge. In a preferred embodiment, each intermediate section 58 is identical in structure. Alternatively, because the reversion energy 36 is greater near posterior section 60 than anterior section 56, posterior section 60 may include a greater number or size of orifices 46.

Adjacent sections are offset by a predetermined angle to achieve the spiraling or helical configuration of device 40. In a preferred embodiment, each section is offset from an adjacent section by 60 degrees. However, it is noted that 60 degrees is an arbitrary choice, and the chambers may be arranged in other orientations as well. This offset is maintained by the use of a key feature between adjacent sections. For example, FIG. 6 shows a key protuberance 62 which fits into a corresponding recess (not visible) in adjacent section 56. This key feature assures that each section of device 40 is properly oriented with respect to each adjacent section. Additionally, keys 62 supplementally ensure that the orientation is maintained while device 40 is in use. The orientation of the sections of device 40 is also maintained by the tight fit of device 40 within tube 20 and by the axial pressure applied on the ends of axis 51. Alternatively, device 40 may be constructed in one piece or sectioned along entirely different lines, transversely, laterally or otherwise.

FIG. 7A is a perspective view of an intermediate section 58 in one embodiment. Intermediate section 58 includes fuel collecting trough 54 having orifices 46. Section 58 also has key 62 for mating with an adjacent intermediate section 58 or anterior section 56.

FIG. 7B shows a perspective view of the embodiment of FIG. 3 with posterior section 60 removed. This view of device 40 from the last intermediate section 58 shows recess 63 for key 62. Additionally, it can be seen that reverse traveling reversion pulses 36 traveling around the circumference of device 40 will enter into reversion chambers 34. At the same time, forward traveling intake air flows 24 and 26 will travel in spiraling or helical intake pathway 42 from anterior end 28 toward posterior end 30.

Figure 7C:
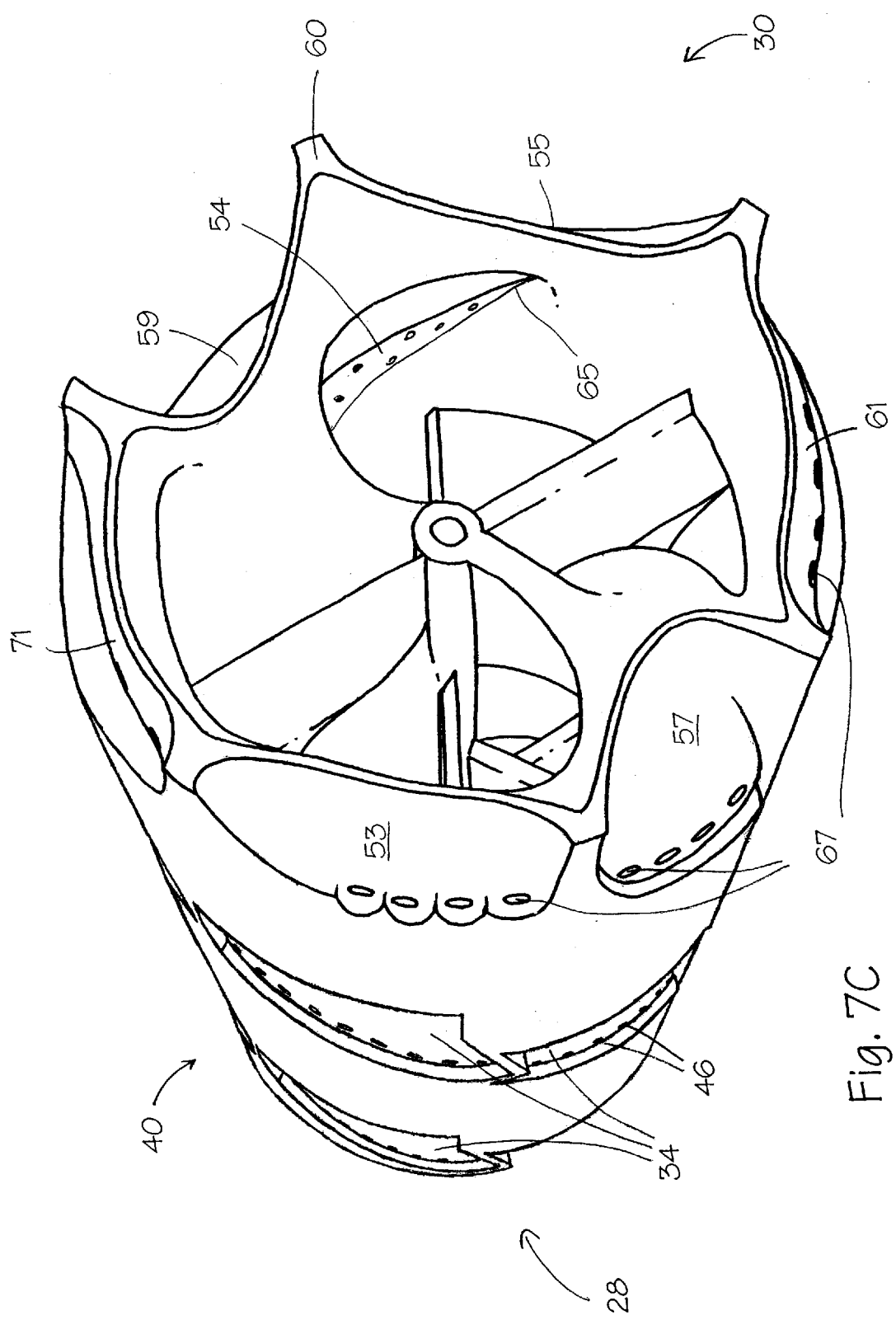
FIG. 7C is a perspective view from the posterior end of the device of the present invention, with the posterior section shown.

FIG. 7C is a perspective view from posterior end 30 of device 40, showing posterior section 60. Posterior section 60 extends walls 52 of the intake pathway to combine air flow paths 24 and 26 into one central path. FIG. 7C additionally shows terminus 65 of fuel collecting trough 54. In a preferred embodiment, six alternate reversion chambers 53, 55, 57, 59, 61, and 63 surround intake pathway 42. Two alternate reversion chambers, 53 and 55, interface with termini 65 of trough 54. Another two alternate reversion chambers, 57 and 59 lead to reversion chambers 34 located on adjacent intermediate section 58. The last two alternate reversion chambers, 61 and 71, provide additional mixing orifices 67 which are not associated with trough 54. Posterior section 60 may also be configured to narrow the intake stream to a smaller diameter before it passes into the engine, thereby increasing throttle responsiveness.

Figure 8:
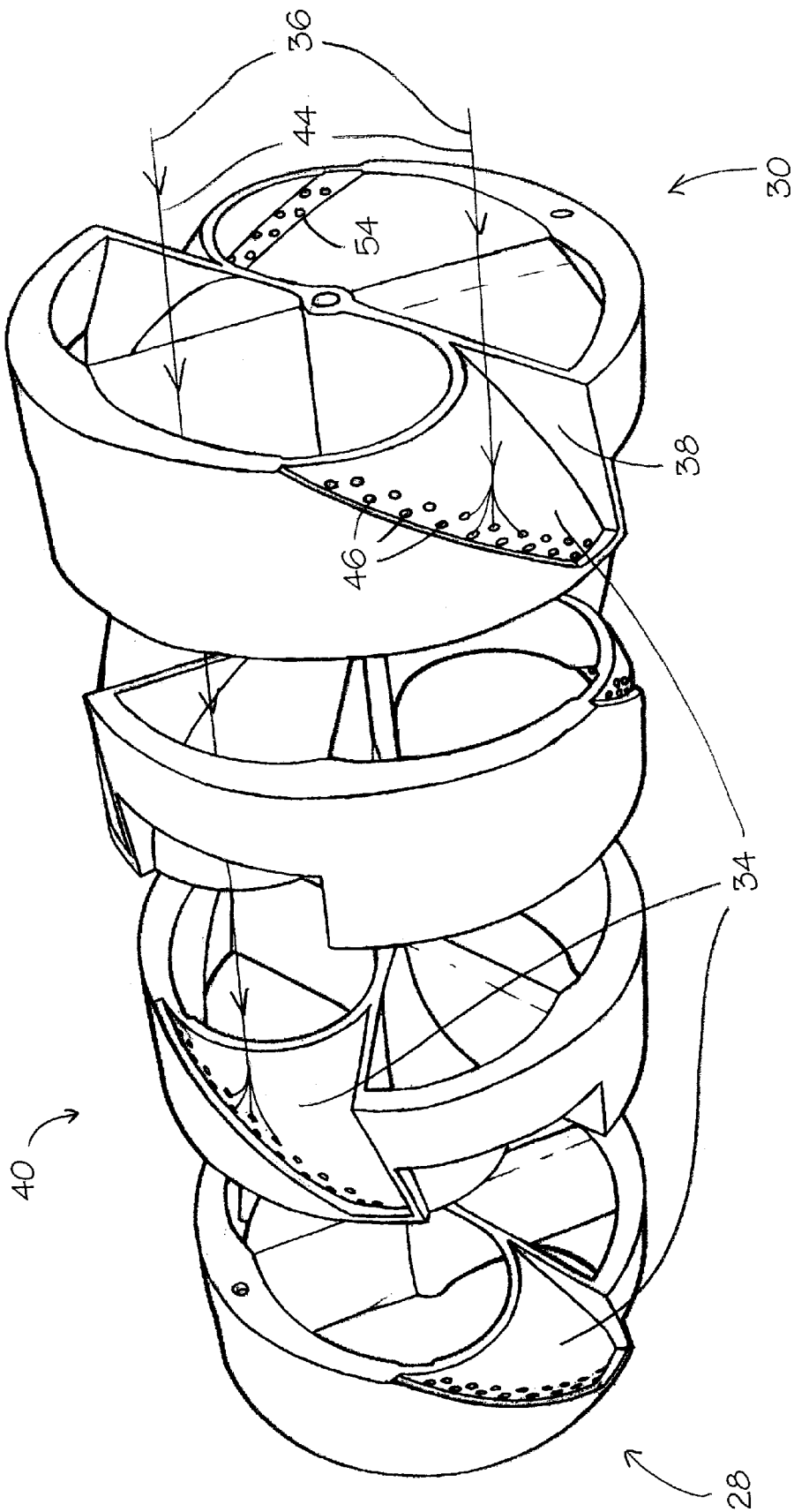
FIG. 8 is an exploded view of the embodiment of FIG. 3 of the present invention, showing the path of the reversion pulse from the posterior end of the device toward the anterior end of the device.

FIG. 8 is an exploded view of the embodiment of FIG. 3 of the present invention, showing the path of reversion pulse 36 from posterior end 30 toward anterior end 28. While four intermediate sections 58 are illustrated in this drawing, it is contemplated that any number of intermediate sections 58 may be used. In this embodiment, anterior section 56 and posterior section 60 are not shown and may be eliminated entirely. The configuration of sections 56 and 60 help to direct the air and finish off the ends of device 40; however, their elimination should not significantly affect the performance of device 40.

As reversion pulse 36 travels from the engine back to the air and fuel mixing device, pulse 36 is captured by a coincident wedge-shaped reversion chamber 34. In this embodiment, each reversion chamber 34 is separated by wall 38 from each adjacent reversion chamber 34. Reversion pulses 36 push fuel which has accumulated in or immediately adjacent to orifices 46 back into the intake pathway 42, thereby atomizing the fuel and supplementing the incoming air and fuel charge by increasing the concentration of small gasoline droplets available in the charge for producing work in the engine. This results in more usable fuel being supplied to the engine. Additionally, it reduces waste and emissions pollution from unburned fuel. These benefits are achieved by harvesting reversion pulses 36 and using the free energy provided thereby. Additionally, it is possible that enhanced engine performance may be the result of improved mixing in intake pathway 42, independent of any wet fuel treatment.

Moreover, since the energy of reversion pulses 36 is being largely dissipated through conversion to mechanical work during formation of gasoline droplets, and through creation of turbulence as it is redirected through orifices 46, the detrimental formation of dehomogenizing standing wave patterns within the intake tract is largely avoided. Because of the sequence of reversion chambers 34 encountered by the reversion pulse 36, device 40 essentially eliminates the reversion pulse 36 before it travels back to the fuel and air mixing device. Since reversion is known to detrimentally affect the performance of the fuel and air mixing device, the reduction of reversion will result in greater torque and power during engine operation. Thus, while reversion 36 has traditionally been the bane of engine users, device 40 not only diminishes the detrimental effects of reversion 36, but actually uses reversion 36 to beneficially increase the output of an engine and decrease the production of waste fuel and harmful emissions.

Figure 9:
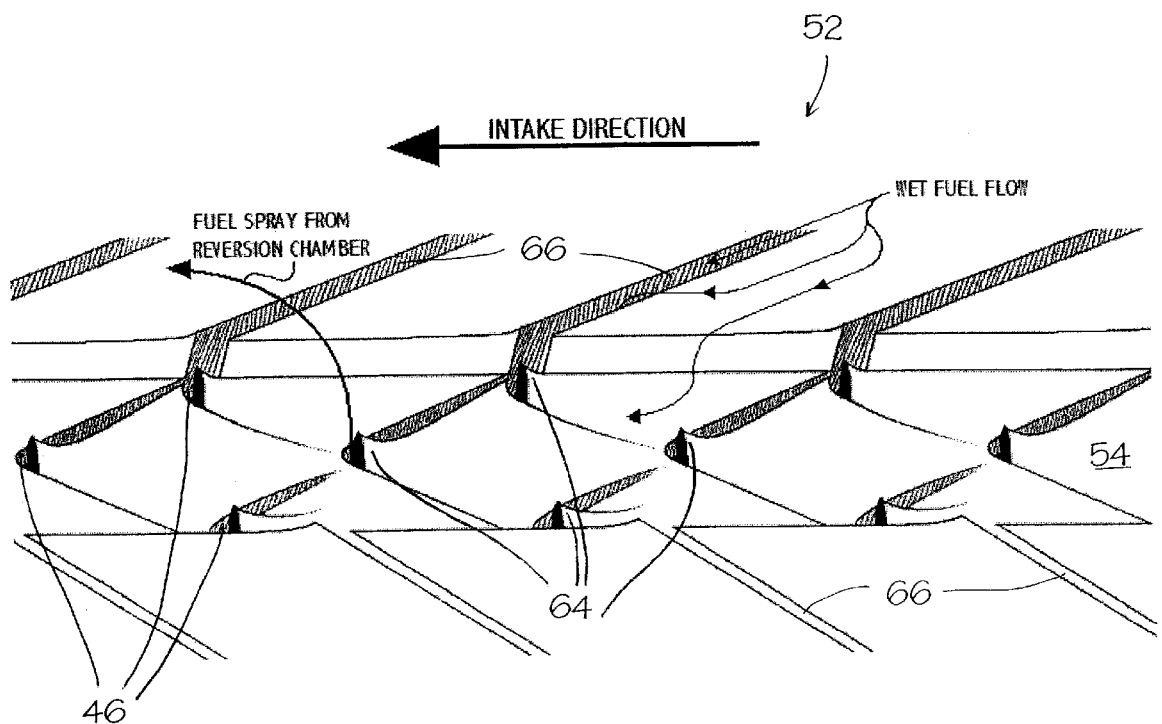
FIG. 9 shows one embodiment of the fuel collecting trough shown in FIG. 5.

FIG. 9 shows one embodiment of fuel collecting trough 54 shown from the intake pathway side 42 of trough 54. Flow of a gas or other fluid over an orifice located on or closely adjacent a surface will generate suction in the orifice towards the flow. This suction will be sometimes referred to herein as a negative pressure or a partial vacuum condition. The amount of suction or negative pressure created is known to depend on flow velocity among other factors. The amount of suction created may be influenced by the location, size, and shape of an orifice. With the careful selection of those parameters for a particular application, a relatively strong suction, that is, a low negative pressure condition or a high vacuum condition, can be created in the orifice, even at lower intake flow velocities.

The size, number, arrangement, and configuration of orifices 46 of fuel collecting trough 54 may be varied to suit each application. It is contemplated that orifices 46 may be shaped as slits, stars, crescents, cracks, or some other shape. The directionality of orifices 46 may also be changed as needed. In a preferred embodiment, each orifice 46 on the reversion chamber 34 side of collecting trough 54 is round and disposed predominantly perpendicularly to a line tangent with the curve of the collecting trough 54. On the intake pathway 42 side, each hole 46 may be designed with a geometry that causes a greater vacuum signal to be generated as the incoming charge flows over it. For instance, each hole 46 may be surrounded by volcano shape 64, which is known to cause a vacuum signal. Such a vacuum assists in directing fuel through orifices 46 from reversion chambers 34. Trough 54 may also consist of a geometry which induces an alternating vacuum signal along its length so that wet fuel and/or air is drawn in one hole and emitted from the next. This can be achieved, for example, by equipping only every other hole with a raised half volcano protrusion 64. Orifices 46 may alternatively be tapered or threaded. Additionally, a series of veins or grooves 66 may be disposed on walls 52 of intake pathway 42 to improve the flow of wet fuel to collecting trough 54.

In an alterative embodiment, instead of disposing orifices 46 within fuel collecting trough 54, trough 54 itself may be constructed of a type of screen, mesh, or similarly porous material which allows the passage of wet fuel and air. Indeed, such a structure may offer both superior wet fuel holding ability and increased fuel holding capacity. Such a material may even provide for superior wet fuel breakup and/or spraying ability, resulting in a finer aggregate droplet size.

The incoming charge will have different velocities in different portions of device 40. Specifically, the highest velocity will occur at the outermost portions of intake pathway 42 just above trough 54, and that is precisely where trough 54 can be most effective. As intake air flows over trough holes 46, a vacuum signal will naturally be created, and a net flow of air from reversion chamber 34 to intake track pathway 42 will occur. Even without wet fuel to spray from reversion chamber 34, this net flow should provide for a dramatic increase in mixing opportunity all along the length of device 40. This improved mixing along the entire length of intake path 42 further breaks up gasoline droplets into even smaller droplets. These smaller droplets lead to improved combustion of the gasoline in the engine, thereby allowing the engine to produce work more efficiently.

Figure 10:
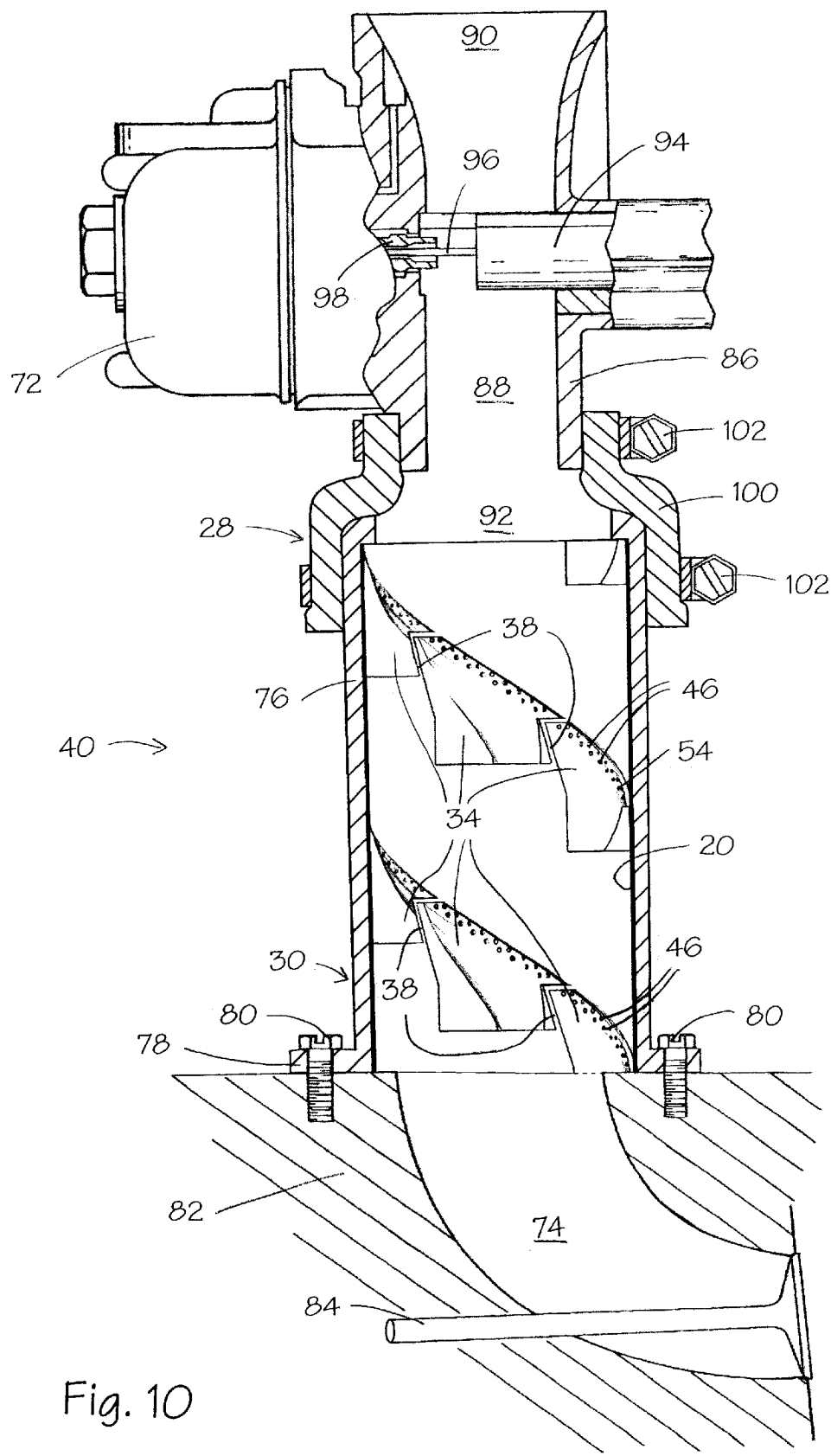
FIG. 10 is an elevation cross-sectional view of one embodiment of the invention installed for use.

FIG. 10 is elevation cross-sectional view of one embodiment of an installment of device 40 for use. FIG. 10 illustrates the positioning of device 40 intermediate carburetor 72 and intake passage 74 of an internal combustion engine. Device 40 is oriented so that anterior or intake end 28 is positioned toward carburetor 72 and posterior or engine end 30 is oriented toward intake passage 74. In the illustrated embodiment, device 40 is encased by sleeve 76, which preferably has a flange 78 through which bolts 80 may be secured to mount device 40 onto engine block 82. In one embodiment, sleeve 76 and tube 20 are a single integral unit. Sleeve 76 is preferably formed of metal or another suitably strong and heat resistant material. In one embodiment, a gasket (not shown) is disposed between flange 78 and engine block 82 to seal the juncture therebetween. Communication between intake passage 74 and a combustion chamber of the engine is controlled by axial movement of intake valve 84 in a conventional manner.

Carburetor 72 is shown as a MIKUNI brand carburetor although it is to be understood that device 40 can be used in association with a wide variety of other carburetors and engines. Carburetor 72 is of conventional construction and operation and includes carburetor body 86 having carburetor bore 88 extending between intake opening 90 and outlet opening 92. Carburetor 72 includes throttle member 94 mounted in carburetor body 86 for slidable movement across carburetor bore 88 to control flow therethrough. Throttle member 94 includes an elongated needle member 96 adjustably mounted on the end thereof. Needle member 96 has a tapered distal end that moves longitudinally in the bore of a needle jet 98 as the throttle member 94 moves across carburetor bore 88 for regulating the introduction of fuel into the air stream flowing through carburetor bore 88. Boot 100 is a conventional carburetor mounting boot made of a flexible material such as rubber. Conventional hose or band clamps 102 secure device 40 to outlet opening 92 of carburetor bore 88.

Although the present invention has been described with reference to preferred embodiments, workers skilled in the art will recognize that changes may be made in form and detail without departing from the spirit and scope of the invention. For example, it may be advantageous to set up an electric or magnetic potential across the intake tract. Such a field could be made to alternate polarity with a frequency conducive to droplet vibration, which could be intense enough to break the gasoline into smaller droplets. There maybe many other effects which an oscillating field could have on the incoming air and fuel mix. For example, such a charged passage may be catalytic to ion formation or other molecular activity in some beneficial way. It may even be possible that one particular frequency could resonate because of the size of device 40 in such a way as to be self-reinforcing and therefore amplified to the point of doing useful work.

A similar advantage may be gained by pumping the intake tract with ultrasonic sound from an outside or internal source. Alternatively, the fuel collecting trough may include tiny "whistles" which are activated by the intake charge or the reversion pulse. In that case, the high frequency acoustic energy produced by the whistles might facilitate droplet breakup in areas where the sound is focused into nodes within the intake tract.

Materials known to be catalytic with particular fuels, including gasoline, for promoting certain chemical reactions or ion formation may be incorporated into the present invention. For example, the fuel collecting trough may be formed from or lined with a material such as platinum. The functionality of such catalytic materials may be enhanced by heat from the hot reversion pulses. Additionally, the functionality of catalytic materials will be enhanced by close association with fuels in a trough design which utilizes a large surface area, such as a mesh or porous structure.

What is claimed is:

1. An apparatus for redirecting a reversion pulse between a combustion chamber of an internal combustion engine and a fuel and air mixing device, the apparatus comprising:
   a helical pathway through which a charge traveling from the fuel and air mixing device to the combustion chamber flows; and
   a chamber disposed at a periphery of the helical pathway into which a reversion pulse traveling from the combustion chamber toward the fuel and air mixing device flows.

2. The apparatus of claim 1 further comprising a plurality of chambers disposed at the periphery of the helical pathway.

3. The apparatus of claim 2 further wherein the charge traveling in the helical pathway communicates with the reversion pulse traveling in the chamber through a plurality of orifices.

4. The apparatus of claim 3 further comprising a fuel collecting trough disposed in the helical pathway and containing the plurality of orifices.

5. The apparatus of claim 4 wherein an orifice further comprises a volcano shape.

6. The apparatus of claim 2 wherein the apparatus is cylindrical and has a diameter and a length.

7. The apparatus of claim 6 wherein the apparatus is sectioned along its length.

8. The apparatus of claim 7 comprising:
   an anterior section;
   a plurality of intermediate sections; and
   a posterior section.

9. The apparatus of claim 8 wherein each of the plurality of intermediate sections is identical.

10. The apparatus of claim 1 further comprising a plurality of helical pathways spiraling around a common axis.

* * * * *

UNITED STATES PATENT AND TRADEMARK OFFICE
CERTIFICATE OF CORRECTION

PATENT NO.      : 6,748,921 B1
DATED           : June 15, 2004
INVENTOR(S)     : Carl Surges It is certified that error appears in the above-identified patent and that said Letters Patent is hereby corrected as shown below:

Title page,
Item [56], References Cited, U.S. PATENT DOCUMENTS, "6,158,412 A 12/2000 Kim" reference, delete "12/306", insert -- 123/306 --

Signed and Sealed this

Twenty-sixth Day of July, 2005

JON W. DUDAS
*Director of the United States Patent and Trademark Office*